US 6,722,696 B2

(12) United States Patent
Sonomura et al.

(10) Patent No.: US 6,722,696 B2
(45) Date of Patent: Apr. 20, 2004

(54) VEHICULAR POWER UNIT ARRANGEMENT STRUCTURE AND METHOD

(75) Inventors: Mitsuhiro Sonomura, Tokyo (JP); Haruaki Nakatsukasa, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/160,271

(22) Filed: Jun. 4, 2002

(65) Prior Publication Data

US 2003/0011184 A1 Jan. 16, 2003

(30) Foreign Application Priority Data

Jun. 4, 2001 (JP) .................................... P2001-168115

(51) Int. Cl.[7] .............................. B62D 21/15; B60K 5/12
(52) U.S. Cl. ........................ 280/784; 180/312; 180/232
(58) Field of Search ........................ 280/784; 180/312, 180/232, 274

(56) References Cited

U.S. PATENT DOCUMENTS

| 3,578,782 A | * | 5/1971 | Miyoshi ................. 180/232 |
| 3,774,712 A | * | 11/1973 | Froumajou ............. 180/232 |
| 5,472,063 A | * | 12/1995 | Watanabe et al. ...... 180/274 |
| 5,477,938 A | * | 12/1995 | Tsuji et al. ............ 180/274 |
| 5,492,193 A | * | 2/1996 | Guertler et al. ........ 180/232 |
| 5,740,876 A | * | 4/1998 | Shimose et al. ........ 180/232 |
| 6,131,685 A | * | 10/2000 | Sakamoto et al. ...... 180/232 |

FOREIGN PATENT DOCUMENTS

JP          09-240291           9/1997

* cited by examiner

Primary Examiner—Charles T. Jordan
Assistant Examiner—John W. Zerr
(74) Attorney, Agent, or Firm—McDermott, Will & Emery

(57) ABSTRACT

A power unit arrangement structure for a vehicle is provided with a side-member extending in a fore and aft direction of a mounting room and enabled to achieve buckling deformation in the fore and aft direction during a frontal collision, a sub-frame extending in the mounting room along the fore and aft direction at an area below the side-member, a mount member having respective an insulating function and permitting a power unit to be supported with the side-member, a bent portion disposed at a substantially intermediate portion of the sub-frame in the fore and aft direction and having a downwardly bent configuration, and a connecting member connecting a lower portion of the power unit to the sub-frame in the vicinity of the bent portion. The mount member is capable of tearing in response to relative movement of the side-member and the power unit in the fore and aft direction during the frontal collision. The sub-frame has a part having a substantially V-shaped configuration in a side view. With such a structure, a falling behavior of the power unit is stably controlled during the frontal collision of the vehicle.

11 Claims, 2 Drawing Sheets

VEHICULAR POWER UNIT ARRANGEMENT STRUCTURE AND METHOD

BACKGROUND OF THE INVENTION

The present invention relates to a vehicular power unit arrangement structure and a method and, more particularly, to a vehicular power unit arrangement structure and its related method which enable a falling behavior of the power unit during a frontal collision of the vehicle to be stably controlled.

Japanese Patent Application Laid-Open Publication No. H9-240291 discloses a vehicular power unit arrangement structure. Such a structure is comprised of right and left downwardly and curvedly contoured sub-frames that are disposed beneath a power-unit mounting room. A lower portion of the power unit is mounted to the right and left sub-frames, with an upper portion of the power unit being mounted to side-members which are disposed above the power-unit mounting room at right and left sides thereof in a way such that the power unit is ready to be released upon receipt of vertical load beyond a given value. That is, with such a structure, downward bending operation of the sub-frame during the frontal collision of the vehicle permits the power unit to fall down.

SUMMARY OF THE INVENTION

However, in such a structure, extensive studies undertaken by the present inventors have revealed that the presence of the curvedly contoured regions of the sub-frames tends to cause the sub-frame to bend in a wide range of an unstable bending region when the sub-frame is subjected to load exerted during the frontal collision of the vehicle. Thus, the need for further improvement in control of the amount of dropping of the power unit would be apparent.

The present invention has been completed with the above view and it is therefore an object of the present invention to provide a vehicular power unit arrangement structure and its related method which is enable to stably control a falling behavior of a power unit during a frontal collision of a vehicle while enabling the power unit to suitably get into an area beneath a vehicular compartment.

According to one aspect of the present invention, a power unit arrangement structure for a vehicle, which has a mounting room partitioned in front of a vehicular compartment for receiving a power unit, comprises: a side-member extending in a fore and aft direction of a mounting room and enabled to achieve buckling deformation in the fore and aft direction during a frontal collision; a sub-frame extending in the mounting room along the fore and aft direction at an area below the side-member; a mount member having respective an insulating function and permitting a power unit to be supported with the side-member, the mount member being capable of tearing in response to relative movement of the side-member and the power unit in the fore and aft direction during the frontal collision; a bent portion disposed at a substantially intermediate portion of the sub-frame in the fore and aft direction and having a downwardly bent configuration; and a connecting member connecting a lower portion of the power unit to the sub-frame in the vicinity of the bent portion. The sub-frame has a part having a substantially V-shaped configuration having the bent portion in a side view.

In other words, in the present invention, a power unit arrangement structure for a vehicle, which has a mounting room partitioned in front of a vehicular compartment for receiving a power unit, comprises: a side-member extending in a fore and aft direction of a mounting room and enabled to achieve buckling deformation in the fore and aft direction during a frontal collision; a sub-frame extending in the mounting room along the fore and aft direction at an area below the side-member; a mount member having respective an insulating function and permitting a power unit to be supported with the side-member, the mount member being capable of tearing in response to relative movement of the side-member and the power unit in the fore and aft direction during the frontal collision; start point defining means, which is disposed at a substantially intermediate portion of the sub-frame along the fore and aft direction, for defining a start point to induce a downwardly convex deformation in the sub-frame during the frontal collision; and connecting means for connecting a lower portion of the power unit to the sub-frame in the vicinity of the bent portion. The sub-frame has a portion having a substantially V-shaped configuration in a side view.

Besides, in the present invention, a method of controlling a falling behavior of a power unit of a vehicle, which has a mounting room partitioned in front of a vehicular compartment for receiving the power unit, comprises: preparing a side-member extending in a fore and aft direction of a mounting room; preparing a sub-frame extending in the mounting room in the fore and aft direction at an area below the side-member, the sub-frame including a bent portion having a downwardly bent configuration formed at a substantially intermediate portion of the sub-frame along the fore and aft direction; preparing a mount member having insulating function and permitting a power unit to be supported with the side-member; preparing a connecting member connecting a lower portion of the power unit to a close proximity area of the bent portion of the sub-frame; causing the side-member to be subjected to buckling deformation in the fore and aft direction during a frontal collision; tearing the mount member in response to relative movement between the side-member and the power unit in the fore and aft direction during the frontal direction; and causing the sub-frame to be bent in downwardly convex configuration at a starting point provided by the bent portion during the frontal collision.

Other and further features, advantages, and benefits of the present invention will become more apparent from the following description taken in conjunction with the following drawings.

DETAILED DESCRIPTION OF THE PREFERRED EMBODIMENTS

Figure 1:
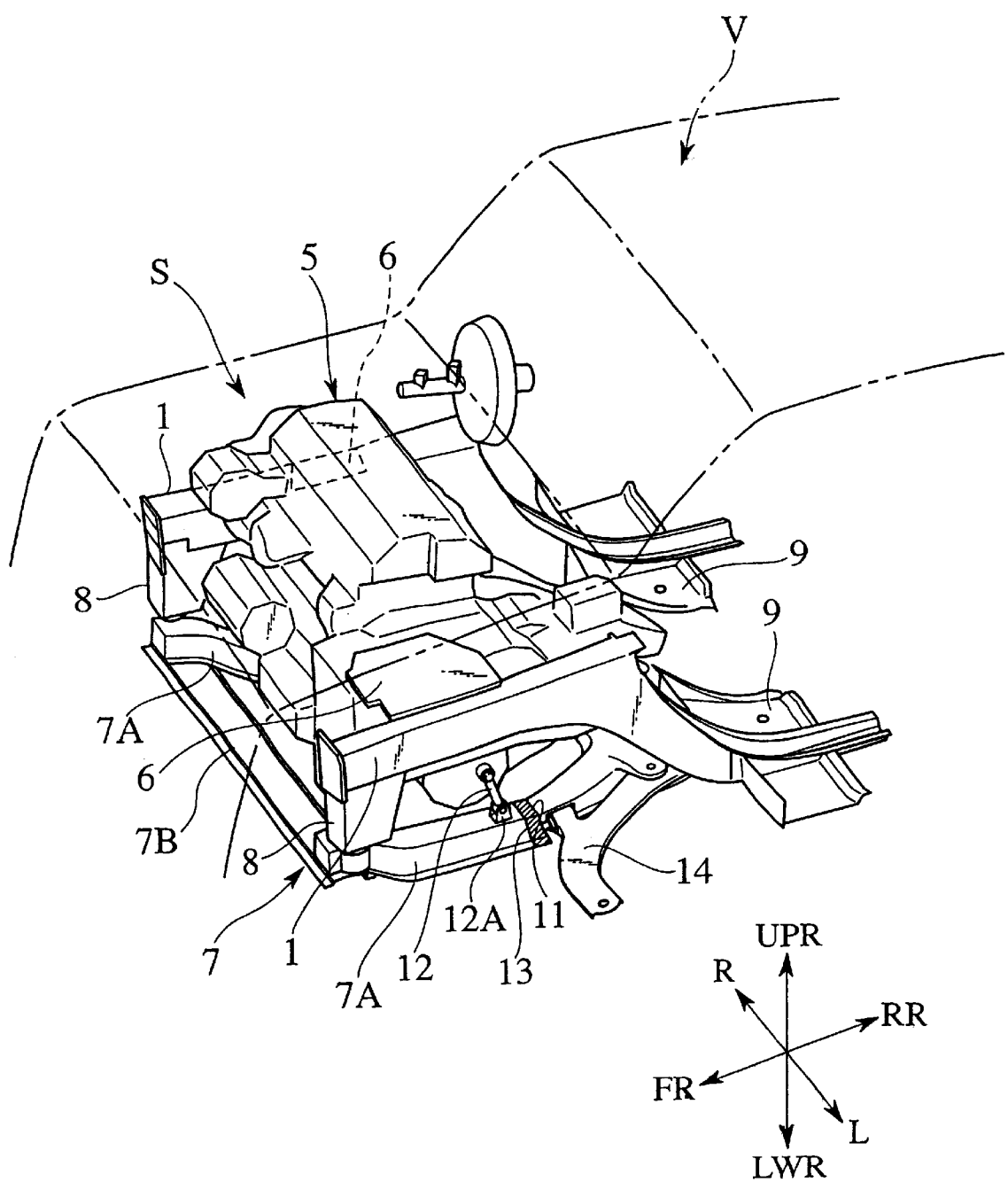
FIG. 1 is a perspective view of a vehicular power unit arrangement structure, shown in a condition with a dash panel being omitted, of a preferred embodiment according to the present invention.

A vehicular power unit arrangement structure and its related method of a preferred embodiment according to the present invention are described below in conjunction with the accompanied drawings. Also, in the drawings, frontward, rearward, rightward, leftward, upward and downward directions of the vehicle are correspondingly designated with reference symbols FR, RR, R, L, UPR and LWR, respectively.

Figure 2:
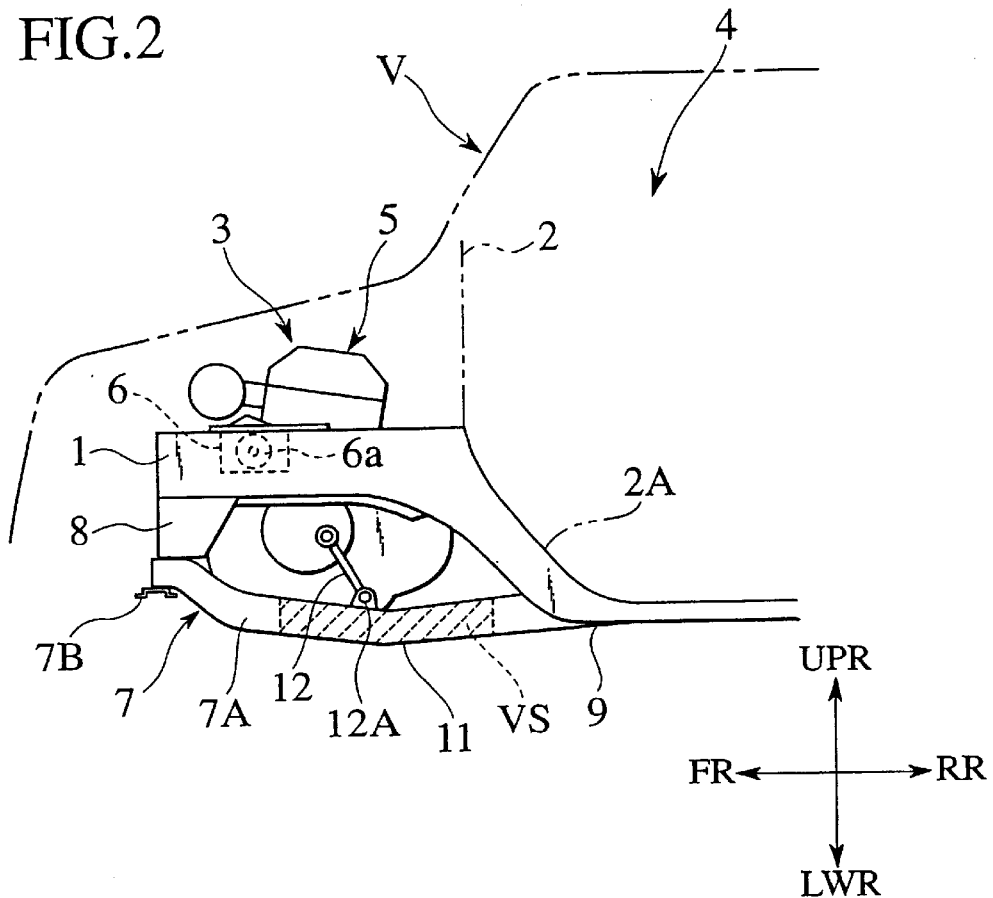
FIG. 2 is a schematic side view of the vehicular power unit arrangement structure of the preferred embodiment.

In FIGS. 1 and 2, the power unit arrangement structure S for the vehicle V includes a pair of side-members 1, 1 which extends in a fore and aft direction at right and left sides of the vehicle V, with the side-members 1, 1 being placed at and facing right and left sides of a mounting room 3 for mounting a power unit 5. The right and left side-members 1, 1 have rear distal ends held in abutting engagement with a dash panel 2 and welded thereto by welding to partition the mounting room 3 and a vehicular compartment 4 from one another. The side-members 1, 1 extend rearward to go into an area beneath a toe-board sloping downward and to be joined thereto by welding. Also, front distal ends of the side-members 1, 1 are suitably interconnected to one another by a cross member which is not shown.

The side-members 1, 1 thus arranged form essential component parts for absorbing impact energy to be exerted to the vehicular compartment 4 during a frontal collision of the vehicle V. More particularly, the side-members 1, 1 are so constructed as to allow a buckling deformation in the fore and aft direction due to axial collapsing load acting on the vehicle V rearward during the frontal collision thereof. In order to have such a function, the side-members 1, 1 are realized in a closed cross sectional structure made of combined panel materials or in a closed cross sectional structure formed by extrusion of an aluminum alloy. If desired, each of the side-members 1, 1 may have a bellows type easy-to-collapse portion that induces the buckling deformation in the fore and aft direction.

Further, the power unit 5 has right and left sides which are supported with the side-members 1, 1, respectively, via mount members 6, 6 composed of insulator rubbers 6a, 6a respectively having noise and vibration insulation properties. With such a structure, if the side-members 1, 1 and the power unit 5 are moved in the fore and aft direction with respect to one another in the frontal collision, the mount members 6, 6 allow the insulator rubbers 6a, 6a to be torn when subjected to a given load for thereby releasing the power unit 5. Also, in the drawings, it is to be noted that the power unit 5 is mounted in a so-called laterally arranged configuration. Moreover, it is to be noted that the present invention is not limited to such a direction in which the power unit is laterally arranged and may also be applied to a structure wherein the power unit is mounted in a so-called longitudinally arranged configuration.

Further, a sub-frame 7 is disposed in the mounting room 3 and includes side-frames 7A, 7A extending longitudinally of the vehicle V at right and left sides thereof in an area below the side-members 1, 1, and a laterally extending front cross frame 7B connected to front ends of the side-frames 7A, 7A.

More particularly, the sub-frame 7 is structured in a so-called parallel cross configuration, and front distal ends of the right and left side-frames 7A, 7A are fixedly coupled to front seat segments 8, 8 extending downward from front distal ends of the side-members 1, 1, respectively, while rear distal ends of the side-frames 7A, 7A are also fixedly coupled to rear seat segments 9, 9 joined to and aligned with a lower surface of a toe board 2A.

Further, the side-frames 7A, 7A of the sub-frame 7 have downwardly facing bent portions 11, 11 formed at intermediate portions thereof in the fore and aft direction. As best shown in FIG. 2, each of the bent portions 11, 11 corresponds to a top portion of a shallow V-shape configuration VS (designated by dotted crosshatch) in the side view, wherein the shallow V-shape configuration VS is formed into a downwardly facing convex configuration with the top position downward in a height approximately from several centimeters to ten and several centimeters, if it is assumend that each of the side-frames 7A, 7A has a length of approximately one meter. Furthermore, a lower portion of the power unit 5 is interconnected to connecting points 12A, 12A, disposed at just forward areas of the bent portions 11, 11 of the side-frames 7A, 7A, by means of rods 12, 12 serving as connecting members. Such connection is suitably performed using fixtures such as bolts and nuts.

As shown in a hatched area in FIG. 1, the power unit arrangement structure of the preferred embodiment includes low rigidity sections 13, 13 formed in regions between the bent portions 11, 11 of the side-frames 7A, 7A and the connecting points 12A, 12A between the rods 12, 12 and the side-frames 7A, 7A. These low rigidity sections 13, 13 are composed of parts having lower rigidities than those of the other areas of the side-frames 7A, 7A.

Although the low rigidity sections 13, 13 are formed by decreasing their plate thicknesses than the other areas of the side-frames 7A, 7A, of course, the present invention is not limited thereto and the same function may be alternatively achieved with the use of parts, each of which is made of material having lower rigidity than that of the other areas of the side-frames 7A, 7A.

In addition, suspension arms 14, 14, which serves as rigid bodies, are connected to and supported with rear areas in close proximity to the bent portions 11, 11, respectively.

Also, it is to be noted that the right side, bent portion 11, rod 12, low rigidity section 13 and suspension arm 14 are omitted in the drawings for the sake of convenience.

Now, the operation of the vehicular power unit arrangement structure with such a structure described above is described more in detail.

During normal state of the vehicle, firstly, the power unit arrangement structure reliably exhibits a noise and vibration transmission control function to adequately preclude the noise and vibration caused by the power unit 5 from being undesirably propagated to the vehicle body because the power unit 5 is supported with the side-members 1, 1 via the mount members 6, 6 having the noise and vibration insulation functions.

Figure 3:
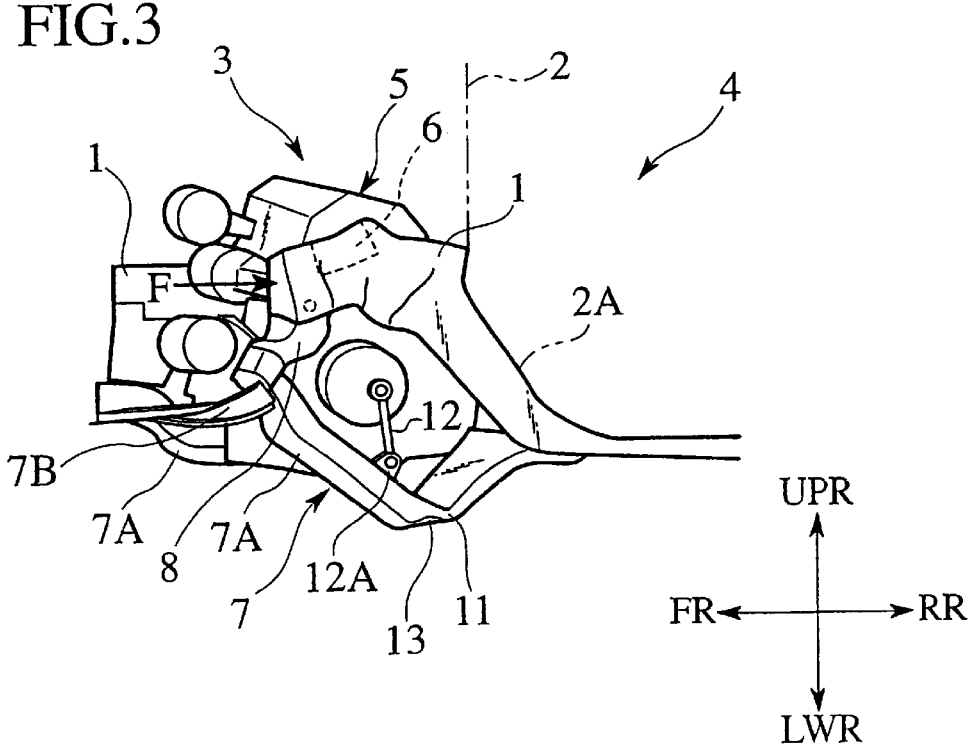
FIG. 3 is a schematic side view of the vehicular power unit arrangement structure of the preferred embodiment in a frontal collision of a vehicle.

On the contrary, during the frontal collision of the vehicle, as shown in FIG. 3, assume that an impact load F is applied to a left, front face of the vehicle in a so-called offset manner. This causes a relative shift to occur in the fore and aft direction of the vehicle between the left side-member 1 and the power unit 5 and thus to tear the left mount member 6, resulting in a release of the power unit 5.

Simultaneously, the left side-frame 7A, having the V-shape configuration VS in the side view, of the sub-frame 7 is bent and deformed in an"L-shape" profile that faces downward at a start point provided by the bent portion 11 formed at the intermediate portion of the side-frame 7A in the longitudinal direction thereof. Then, due to the left rod 12 connected to the connecting point 12A just ahead of the bent portion 11, the mainly left side of the power unit 5 begins to drop and move downward such that the power unit 5 is pulled downward while, at the same time, the mainly left side of the power unit 5 is rotated in a rearward winding-down direction about a pivot formed by the deforming front seat segment 8 serving as the connecting member of the front side of the sub-frame 7. As a result, the mainly left side of the power unit 5 is caused to drop downward from a rear side of the same.

With such operation, the bending point of the left side of the sub-frame 7 is defined at the left bent portion 11 disposed at the intermediate portion in the longitudinal direction of the left side-frame, thereby permitting the power unit 5 to drop in an amount stabilized in a substantially maximum value. Simultaneously, the mainly left side of the power unit 5 has a falling behavior to reliably allow the rear side of the same to drop and move into a stabilized position. As a result, the mainly left side of the power unit 5 is enabled to get into a region below the vehicular compartment 4 in a reliable manner to effectively limit the vehicular compartment 4 from being excessively deformed while effectively precluding a collapsing deformation of the left side-member 1 in the fore and aft direction from being inhibited with the power unit 5. Thus, the left side-member 1 has an increased collapsing stroke for thereby remarkably increasing an absorbing capability of impact energy.

In the preferred embodiment, further, since the left low rigidity section 13 is formed in the region between the bent portion 11 of the left side-frame 7A and the just rear area of the left connecting point 12A of the left rod 12, during the collision of the vehicle, the left rigidity section 13 induces a downward bending deformation at the start point provided by the bent portion 11 of the left side-frame 7A while, at the same time, the presence of the left suspension arm 14 connected to and supported with the just rear area of the left bent portion 11 allows the rear area of the left bent portion 11 to have a highly rigid area to easily cause a stress concentration at the left bent portion 11 for thereby causing the power unit 5 to drop and move downward in a more reliable manner.

While the foregoing description of the operation of the preferred embodiment has been made in conjunction with an example applied to the so-called left offset type frontal collision of the vehicle, it is to be noted that the present invention may provide the same effect even in a so-called right offset type frontal collision or in an entire frontal collision involving collisions of the both types.

As set forth above, according to a structure of the preferred embodiment, during the normal state, since the power unit is supported with the side-members via the mount members having respective anti-vibrating functions, the vibration-transfer mitigating capability is adequately enhanced for preventing vibration of the power unit from being transferred to the vehicle body. During the frontal collision of the vehicle, further, due to the relative movement between the side-members and the power unit in the fore and aft direction thereof, the mount member is torn resulting in the release of the power unit while, at the same time, the sub-frame formed with the V-shape configurations, when viewed in side plane, is deformed downward into the L-shape profile at the start point defined by the bent portion formed at the intermediate portion of the sub-frame in the longitudinal direction thereof. This causes the connecting member having the connecting member in the vicinity of the bent portion to pull the power unit downward to be dropped and moved. In addition to such effect, the power unit is exerted with rotational behavior in the rear warping direction about the pivot provided by the connecting portion of the front distal end of the side-frame, causing the power unit to drop from its rear side.

Consequently, the bending point of the sub-frame is established at the intermediate portion in the longitudinal direction of the sub-frame to allow the amount of dropping of the power unit to be stabilized at the substantially maximum value. Also, the power unit is reliably caused to get into the area below the vehicular compartment to limit the excessive deformation of the vehicular compartment. When this takes place, moreover, the collapsible deformation of the side-member in its longitudinal direction is not interfered with the power unit, resulting in the increase in the collapsible stroke of the side-member for thereby providing an improved impact energy absorbing effect.

Furthermore, the presence of the connecting point of the connecting member disposed at the immediately forward area of the bent portion of the sub-frame enables the falling behavior of the power unit to be initiated from the rear side in the reliable manner in a more stabilized fashion.

Also, the presence of the low rigidity section formed between the bent portion of the sub-frame and the connecting point of the connecting member induces the downward bending deformation of the sub-frame at the starting point provided by the bent portion thereof, enabling the falling operation of the power unit to be more reliably effectuated.

Finally, the presence of the rigid suspension arm connected to and supported with the rear area of the bent portion of the sub-frame allows the rear area of the bent portion to have an increased rigid structure to cause the stress concentration to easily occur at the bent portion, enabling the falling operation of the power unit in a more reliable manner.

The entire content of a Patent Application No. TOKUGAN 2001-168115 with a filing date of Jun. 4, 2001 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A power unit arrangement structure for a vehicle, which has a mounting room partitioned in front of a vehicular compartment for receiving a power unit, comprising:
   a side-member extending in a fore and aft direction of a mounting room and enabled to achieve buckling deformation in the fore and aft direction during a frontal collision;
   a sub-frame extending in the mounting room along the fore and aft direction at an area below the side-member;
   a mount member having an insulating function and permitting a power unit to be supported with the side-member, the mount member being capable of tearing in response to relative movement of the side-member and the power unit in the fore and aft direction during the frontal collision;
   a bent portion disposed at a substantially intermediate portion of the sub-frame in the fore and aft direction and having a downwardly bent configuration; and a connecting member connecting a lower portion of the power unit to the sub-frame in the vicinity of the bent portion,
   wherein the sub-frame has a part having a substantially V-shaped configuration having the bent portion in a side view,
   and wherein the connecting member has a connecting point disposed at a just front area of the bent portion of the sub-frame for connecting the power unit to a portion in the vicinity of the bent portion of the sub-frame.

2. A power unit arrangement structure according to claim 1, wherein the sub-frame has a low rigidity section formed between the bent portion of the sub-frame and a connecting point of the connecting member by which the power unit is connected to a portion in the vicinity of the bent portion of the sub-frame.

3. A power unit arrangement structure according to claim 1, further comprising a suspension arm connected to and supported with a just rear area of the bent portion of the sub-frame.

4. A power unit arrangement structure according to claim 1, wherein the side-member, a part of the sub-frame, the mount member and the connecting member are located at right and left sides, respectively.

5. A power unit arrangement structure according to claim 1, wherein the sub-frame is formed in a cross configuration and has front a distal end connected to and fixed to a seat segment extending downward from a front distal end of the side-member, with a rear distal end of the sub-frame being coupled to and fixed to a seat segment joined to a lower surface of a toe board disposed in front of the vehicular compartment.

6. A power unit arrangement structure according to claim 1, wherein the insulating function of the mount member is exhibited by an insulator rubber which is enabled to be torn in response to the relative movement between the side-member and the power unit in the fore and aft direction during the frontal collision.

7. A power unit arrangement structure for a vehicle, which has a mounting room partitioned in front of a vehicular compartment for receiving a power unit, comprising:

a side-member extending in a fore and aft direction of a mounting room and enabled to achieve buckling deformation in the fore and aft direction during a frontal collision;

a sub-frame extending in the mounting room along the fore and aft direction at an area below the side-member;

a mount member having an insulating function and permitting a power unit to be supported with the side-member, the mount member being capable of tearing in response to relative movement of the side-member and the power unit in the fore and aft direction during the frontal collision;

start point defining means, which is disposed at a substantially intermediate portion of the sub-frame along the fore and aft direction, for defining a start point to induce a downwardly convex deformation in the sub-frame during the frontal collision; and connecting means for connecting a lower portion of the power unit to the sub-frame in the vicinity of the start point defining means, wherein the sub-frame has a portion having a substantially V-shaped configuration in a side view, and wherein the connecting means has a connecting point disposed at a just front area of the start point defining means of the sub-frame for connecting the power unit to a portion in the vicinity of the start point defining means of the sub-frame.

8. A method of controlling a falling behavior of a power unit of a vehicle, which has a mounting room partitioned in front of a vehicular compartment for receiving the power unit, comprising:

preparing a side-member extending in a fore and aft direction of a mounting room;

preparing a sub-frame extending in the mounting room in the fore and aft direction at an area below the side-member, the sub-frame including a bent portion having a downwardly bent configuration formed at a substantially intermediate portion of the sub-frame along the fore and aft direction;

preparing a mount member having insulating function and permitting a power unit to be supported with the side-member;

preparing a connecting member connecting a lower portion of the power unit to a close proximity area of the bent portion of the sub-frame the connecting member having a connecting point disposed at a just front area of the bent portion of the sub-frame for connecting the power unit to a portion in the vicinity of the bent portion of the sub-frame;

causing the side-member to be subjected to buckling deformation in the fore and aft direction during a frontal collision;

tearing the mount member in response to relative movement between the side-member and the power unit in the fore and aft direction during the frontal collision;

causing the sub-frame to be bent in downwardly convex configuration at a starting point provided by the bent portion during the frontal collision; and causing the power unit to be pulled downward during the frontal collision.

9. A power unit arrangement structure for a vehicle, which has a mounting room partitioned in front of a vehicular compartment for receiving a power unit, comprising:

a side-member extending in a fore and aft direction of a mounting room and enabled to achieve buckling deformation in the fore and aft direction during a frontal collision;

a sub-frame extending in the mounting room along the fore and aft direction at an area below the side-member;

a mount member having an insulating function and permitting a power unit to be supported with the side-member, the mount member being capable of tearing in response to relative movement of the side-member and the power unit in the fore and aft direction during the frontal collision;

a bent portion disposed at a substantially intermediate portion of the sub-frame in the fore and aft direction and having a downwardly bent configuration; and a connecting member connecting a lower portion of the power unit to the sub-frame in the vicinity of the bent portion, wherein the sub-frame has a part having a substantially V-shaped configuration having the bent portion in a side view; and a suspension arm connected to and supported with a just rear area of the bent portion of the sub-frame.

10. A power unit arrangement structure for a vehicle, which has a mounting room partitioned in front of a vehicular compartment for receiving a power unit, comprising:

a side-member extending in a fore and aft direction of a mounting room and enabled to achieve buckling deformation in the fore and aft direction during a frontal collision;

a sub-frame extending in the mounting room along the fore and aft direction at an area below the side-member;

a mount member having an insulating function and permitting a power unit to be supported with the side-member, the mount member being capable of tearing in response to relative movement of the side-member and the power unit in the fore and aft direction during the frontal collision;

a bent portion disposed at a substantially intermediate portion of the sub-frame in the fore and aft direction and having a downwardly bent configuration; and a connecting member connecting a lower portion of the power unit to the sub-frame in the vicinity of the bent portion, wherein the sub-frame has a part having a substantially V-shaped configuration having the bent portion in a side view; and wherein the side-member, a part of the sub-frame, the mount member and the connecting member are located at right and left sides, respectively.

11. A power unit arrangement structure for a vehicle, which has a mounting room partitioned in front of a vehicular compartment for receiving a power unit, comprising:

a side-member extending in a fore and aft direction of a mounting room and enabled to achieve buckling deformation in the fore and aft direction during a frontal collision;

a sub-frame extending in the mounting room along the fore and aft direction at an area below the side-member;

a mount member having an insulating function and permitting a power unit to be supported with the side-member, the mount member being capable of tearing in response to relative movement of the side-member and the power unit in the fore and aft direction during the frontal collision;

a bent portion disposed at a substantially intermediate portion of the sub-frame in the fore and aft direction and having a downwardly bent configuration; and a connecting member connecting a lower portion of the power unit to the sub-frame in the vicinity of the bent portion, wherein the sub-frame has a part having a substantially V-shaped configuration having the bent portion in a side view; and wherein the sub-frame is formed in a cross configuration and has front a distal end connected to and fixed to a seat segment extending downward from a front distal end of the side-member, with a rear distal end of the sub-frame being coupled to and fixed to a seat segment joined to a lower surface of a toe board disposed in front of the vehicular compartment.

* * * * *